United States Patent [19]

Munter

[11] 4,446,452
[45] May 1, 1984

[54] MAGNITUDE COMPARATOR CIRCUIT AND METHOD

[75] Inventor: Ernst A. Munter, Kanata, Canada

[73] Assignee: Northern Telecom Limited, Montreal, Canada

[21] Appl. No.: 292,497

[22] Filed: Aug. 13, 1981

[30] Foreign Application Priority Data

Jun. 23, 1981 [CA] Canada ................................ 380396

[51] Int. Cl.³ .............................................. G06F 7/02
[52] U.S. Cl. ................................................ 340/146.2
[58] Field of Search ...................... 340/146.2; 364/900

[56] References Cited

U.S. PATENT DOCUMENTS

| | | | |
|---|---|---|---|
| 2,821,696 | 1/1958 | Shiowitz | 340/146.2 |
| 3,251,035 | 5/1966 | Weinstein | 340/146.2 |
| 3,731,765 | 5/1973 | Robaszkiewicz | 340/146.2 |
| 3,740,538 | 6/1973 | Hemphill | 340/146.2 |
| 3,921,134 | 11/1975 | Myagkov et al. | 340/146.2 |
| 4,255,740 | 3/1981 | Ferrie | 340/146.2 |

FOREIGN PATENT DOCUMENTS

| | | | |
|---|---|---|---|
| 840884 | 6/1981 | U.S.S.R. | 340/146.2 |
| 840887 | 6/1981 | U.S.S.R. | 340/146.2 |

OTHER PUBLICATIONS

Dimitri, "Dynamic Binary Word Comparator", *IBM Tech. Disclosure Bulletin*, vol. 14, No. 8, Jan. 1972, pp. 2292-2293.

Shirley, "Parallel-Search Max/Min Word Algorithm", *IBM Tech. Disc. Bulletin*, vol. 22, No. 7, Dec. 1979, pp. 2671-2672.

Texas Instruments Bulletin No. DL-S 7411810, Mar. 1974, pp. S-119-S-120.

*Primary Examiner*—David H. Malzahn
*Attorney, Agent, or Firm*—Robert C. Hogeboom

[57] ABSTRACT

A magnitude comparator circuit is provided for determining the largest binary number, out of a plurality of binary numbers received bit-serially, in parallel. A latch is used to store the results of the comparison and is initialized to an all logic 0 state. The latch has a unique one-bit location corresponding to each number being compared, and a logic 0 stored in the latch indicates that the number corresponding thereto is still in contention (i.e. remains a candidate) for being the largest, and a logic 1 indicates it has been eliminated from contention. As the numbers are received bit by bit (most significant bits first) the bits are applied to gating circuits, one for each number, which invert the bits and store the inverted result in the latch. The exceptions to this are twofold; (a) when a number has already been eliminated from contention, as indicated by a logic 1 stored in the latch corresponding to that number, it remains a logic 1; and (b) when the remaining candidates all have a binary 0 in an equal significant bit location no choice is of course possible and the aforestated inversion does not take place and the contents of the latch are simply recycled.

11 Claims, 2 Drawing Figures

MAGNITUDE COMPARATOR CIRCUIT AND METHOD

BACKGROUND OF THE INVENTION

This invention relates generally to magnitude comparators, and more particularly to magnitude comparators for determining which binary number, out of a plurality of binary numbers received bit-serially, in parallel, is the largest.

Magnitude comparators are well known. One example of a known magnitude comparator is the Texas Instruments model SN74L85. This comparator serves to compare two, four bit binary numbers, received in parallel; larger numbers can be compared by cascading these devices. However, no more than two numbers can be compared at a time. If it is desired to compare more than two numbers, the numbers must first be paired, the largest of each pair is then determined and this pairing procedure continued until finally a single number is determined to be the largest.

SUMMARY OF THE INVENTION

In simplified terms, the present invention provides a comparator circuit that receives a plurality of binary numbers (e.g. five) bit-serially in parallel and produces an indication of the largest number. In somewhat more detail, the five numbers are received at the same time (i.e. in parallel) but they are received one bit at a time, beginning with the most significant bit and continuing in declining order of significance. In other words, the five most significant bits (MSB) of the numbers are received first, followed by the five second most significant bits of the numbers, etc., until all the bits have been received.

As the bits are being received the comparator circuit of the present invention, in simplistic terms, monitors the bits and stores the result in a register (latch) having one bit location corresponding to each number (i.e. five bit locations in this example). The latch is initialized to all logic zeroes. For the present description a binary 0 is encoded as a logic 0 and a binary 1 is encoded as a logic 1. Beginning with the MSB, if a logic 1 is received, the bit corresponding to that number remains a logic 0; if a logic 0 is received, the bit corresponding to that number becoms a logic 1 (unless all the MSBs are logic 0's, in which case the bits in the latch remain logic 0's). Once a bit in the latch becomes a logic 1, feedback circuitry ensures that it remains a logic 1 until the selection of the largest number has occurred. This process repeats itself, as the second most significant bits are received. If the second most significant bit is a logic 0, the corresponding bit in the latch becomes a logic 1 (unless all the second most significant bits from the remaining candidates are all logic 0's, in which case the corresponding bits in the latch remain logic 0's). If the bit is a logic 1, the corresponding bit stored in the latch remains as it is; if it is a logic 1, it stays a logic 1, and if it is a logic 0 it remains a logic 0. This process repeats itself with the remaining bits of the numbers until all the bits have been received. At that time at least one bit in the latch will still be a logic 0; the number corresponding to that 0 bit is the largest number. If two bits in the latch are both logic 0's, this indicates that two of the numbers are identical.

Stated in other terms, the present invention is a circuit for determining which serially received binary number, out of a plurality of binary numbers received bit-serially in parallel, has the largest magnitude, the circuit comprising: a storage means having at least a one bit location corresponding to each binary number; and gating means, for each said number, for storing in a respective one of said locations in said storage means, in response to each bit of said number, (a) the previous logic state stored in said location if said bit is a binary 1, or (b) a first logic state if said bit is a binary 0 and is associated with a binary number that is a remaining candidate for having the largest magnitude and the corresponding bits of the remaining other binary numbers, candidates, are also binary 0's, or (c) a second logic state if said bit is a binary 0 and either (i) said bit is not associated with a binary number that is a remaining candidate for having the largest magnitude, or (ii) said bit is associated with a binary number that is a remaining candidate for having the largest magnitude but the corresponding bits of the other binary numbers, remaining candidates, are not all binary 0's.

Stated in yet other terms, the present invention is a circuit for determining which serially received binary number, out of a plurality of binary numbers, received bit-serially in parallel, has the largest magnitude, the circuit comprising: a storage means having a one bit location corresponding to each binary number; a plurality of gating means, one for each number, each gating means responsive to the bits of one number, bit by bit, in order of declining significance, the gating means inverting each bit received and applying it to the location in the storage means, unless all equal significant bits of binary numbers that remain candidates are binary 0's in which case the bits in the storage means are unchanged, or unless a bit stored in the storage means is a logic 1, in which case that bit remains a logic 1.

Stated in still other terms, the present invention is a method for determining which serially received binary number, out of a plurality of binary numbers, received bit-serially in parallel, has the largest magnitude, the method comprising the steps of: (a) for each number, receiving the bits from the number, one bit at a time, in declining order of significance; (b) sequentially inverting each bit and storing the result in a storage means such that a logic 0 indicates that the corresponding number remains a candidate for being the largest and a logic 1 indicates it has been eliminated, unless (i) all the equal significant bits of the numbers that remain candidates are all 0, in which case the bits in the storage means are unchanged, or (ii) a logic 1 was previously stored in the storage means, in which case it remains a logic 1.

Stated in yet again different terms, the present invention is a method for ranking, in order of magnitude, a plurality N of binary numbers received in parallel, wherein N is a positive integer, the method comprising the steps of: (a) comparing the N binary numbers and determining which one is the largest; (b) eliminating from contention all numbers previously chosen as being the largest and determining the largest of the remaining numbers; and (c) repeating step (b) until (N−1) numbers have been eliminated from contention, such that the order in which a number is so eliminated is its rank order.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
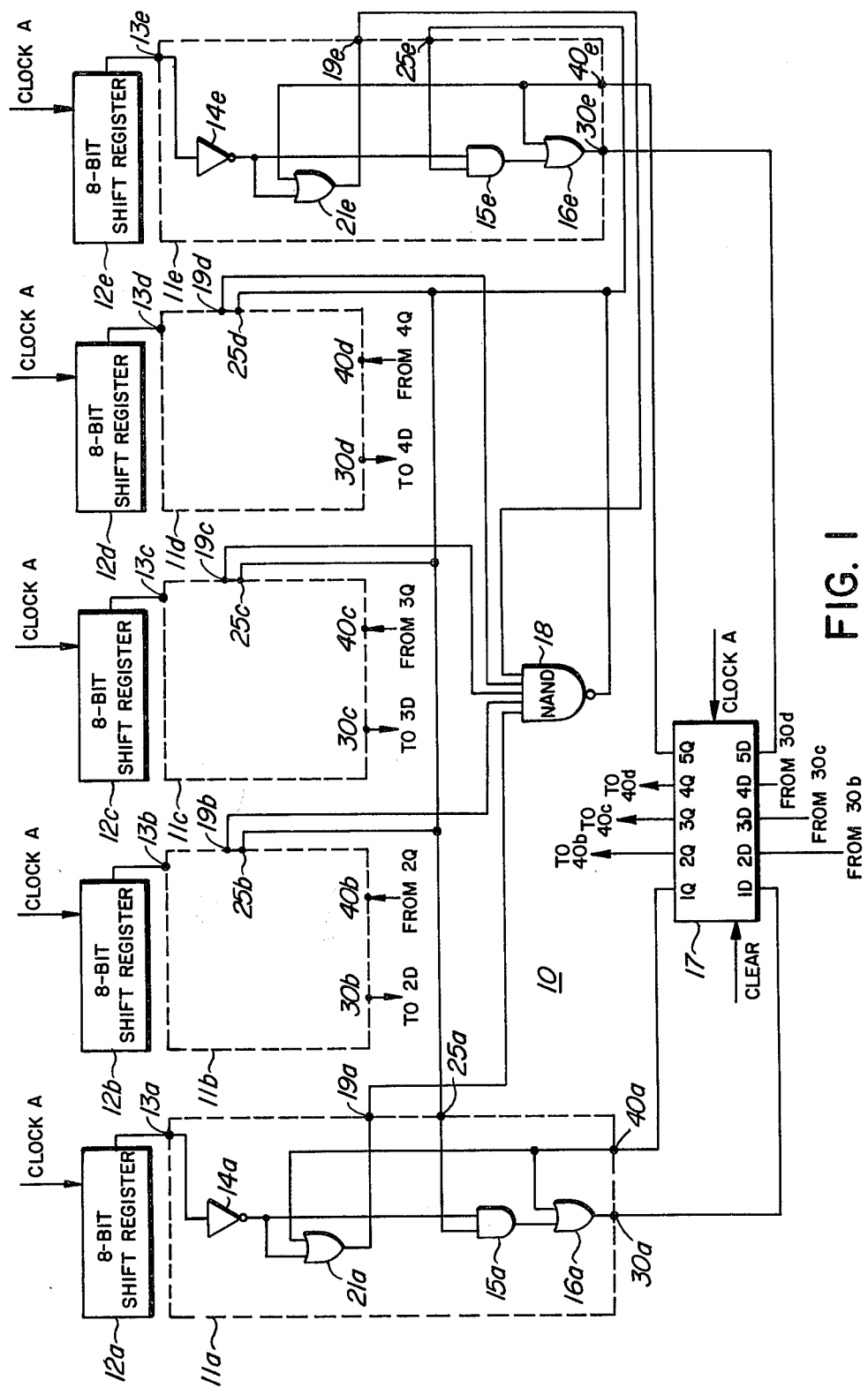
FIG. 1 is a simplified schematic of the preferred embodiment of the present invention.

FIG. 1 depicts a simplified schematic of a magnitude comparator 10 constructed according to the present invention and designed to determine the eight-bit binary number, out of five different numbers, that has the largest magnitude. The components are interconnected as depicted in FIG. 1 and attention is directed thereto; note that gating circuits 11a, 11b, 11c, 11d and 11e, referred to collectively as gating circuits 11, are all identical in construction. Gating circuits 11b, 11c, and 11d have not been shown in detail in order not to unduly complicate the Figure.

The five numbers to be compared by comparator 10 are stored in eight-bit shift registers 12a, 12b, 12c, 12d, and 12e, referred to collectively as shift registers 12; one number is stored in each register 12. The operation of comparator 10 is as follows.

Each gating circuit 11 functions as follows, and for an illustrative example, gating circuit 11a will be employed. As shift register 12a is clocked by clock A (e.g. 8 MHz), the eight bits stored in register 12a are applied to terminal 13a, the input terminal to both gating circuit 11a and NOR gate 14a. Note that the bits are applied one at a time, in declining order of significance, and commence with the most significant bit.

If the most significant bit (MSB) stored in register 12a is a logic 1, the output of inverter 14a is a logic 0, and consequently the output of AND gate 15a is likewise a logic 0. As a result, the two inputs of OR gate 16a are both logic 0's. The one input since it is the output of AND gate 15a, and the other input via terminal 40a since it is from output terminal 1Q of register 17, (e.g. a Texas Instruments SN74LS174) which has been initialized to contain all logic 0's (via the clear input). Consequently, the output of OR gate 16a is a logic 0 which is in turn applied to input terminal 1D, via output terminal 30a, and stored in register 17.

If the second most significant bit received by gating circuit 11a is a logic 0, the output of NOR gate 14a is a logic 1 which is applied to one input of AND gate 15a. The logic state of the output of AND gate 15a then depends upon the state of its second input. To determine this we have to look at the signal originating from NAND gate 18, and consequently at the signals from terminals 19a, 19b, 19c, 19d, and 19e, referred to collectively as terminals 19.

Using gating circuit 11a as an example, it can be seen that if there is a logic 1 stored in register 17, corresponding to a particular gating circuit 11, OR gate 21a receives a logic 1 on its right input and consequently produces a logic 1 on its output (regardless of the state of its other input) which is of course applied to NAND gate 18.

Alternatively, the output of OR gate 21a can also be a logic 1 when the bit applied to terminal 13a is a logic 0. The logic 0 applied to terminal 13a results in a logic 1 at the output of NOR gate 14a, and consequently the output of OR gate 21a is a logic 1 which is applied to NAND gate 18.

In summary, the logic signal at terminal 19 is a logic 1 if either of two conditions exist; namely, either (a) the bit received at terminal 13 is a logic 0 or (b) the corresponding bit stored in register 17 is a logic 1. Note that a logic 1 stored in register 17 indicates that the number corresponding thereto has been eliminated from consideration as being the largest, and that a logic 0 stored in register 17 indicates that the number corresponding thereto remains a candidate for being the largest.

Since NAND gate 18 receives a logic 1 signal from those gating circuits 11 associated with a number eliminated from contention, and a logic 1 signal from those gating circuits 11 that currently are receiving a logic 0 signal from register 12, a logic 0 signal output from NAND gate 18 indicates that the instant bits from the numbers still under consideration (i.e. the remaining candidates) are all logic 0's. This of course indicates that no choice can be made as to the relative magnitudes of the remaining candidates based upon the bits of that order of significance. AND gate 15a receives the logic 0 output of NAND gate 18, via terminal 25a, thus forcing the output of AND gate 15a to a logic 0 state. This allows the state of the corresponding bit stored in register 17 to remain unchanged since it is simply looped back via OR gate 16a.

If the instant bits from the remaining candidates are not all logic 0's, then the output of NAND gate 18 is a logic 1, allowing the output of AND gate 15a to be determined by the remaining (i.e. right) input. Consequently, if terminal 13a receives a logic 1, the output of NOR gate 14a is a logic 0, and the output of AND gate 15a is consequently a logic 0. If the bit received by terminal 13a is a logic 0, the output of NOR gate 14a is a logic 1, and the output of AND gate 15a is a logic 1, and the output of OR gate 16a is a logic 1, resulting in a logic 1 being stored in register 17, in a bit-location corresponding to that number.

After all the bits from registers 12 have been applied to the appropriate gating circuits 11, the resultant state of register 17 is examined to determine which number is the largest. As an example, if the output at terminal 1Q of register 17 is a logic 0 and the output at terminals 2Q, 3Q, 4Q and 5Q are all logic 1's, then this indicates that the number that had been stored in register 12a is the largest; alternatively, if terminal 3Q is a logic 0, and terminals 1Q, 2Q, 4Q and 5Q are logic 1's, then this indicates that the number that had been stored in register 12c is the largest, etc.

Figure 2:
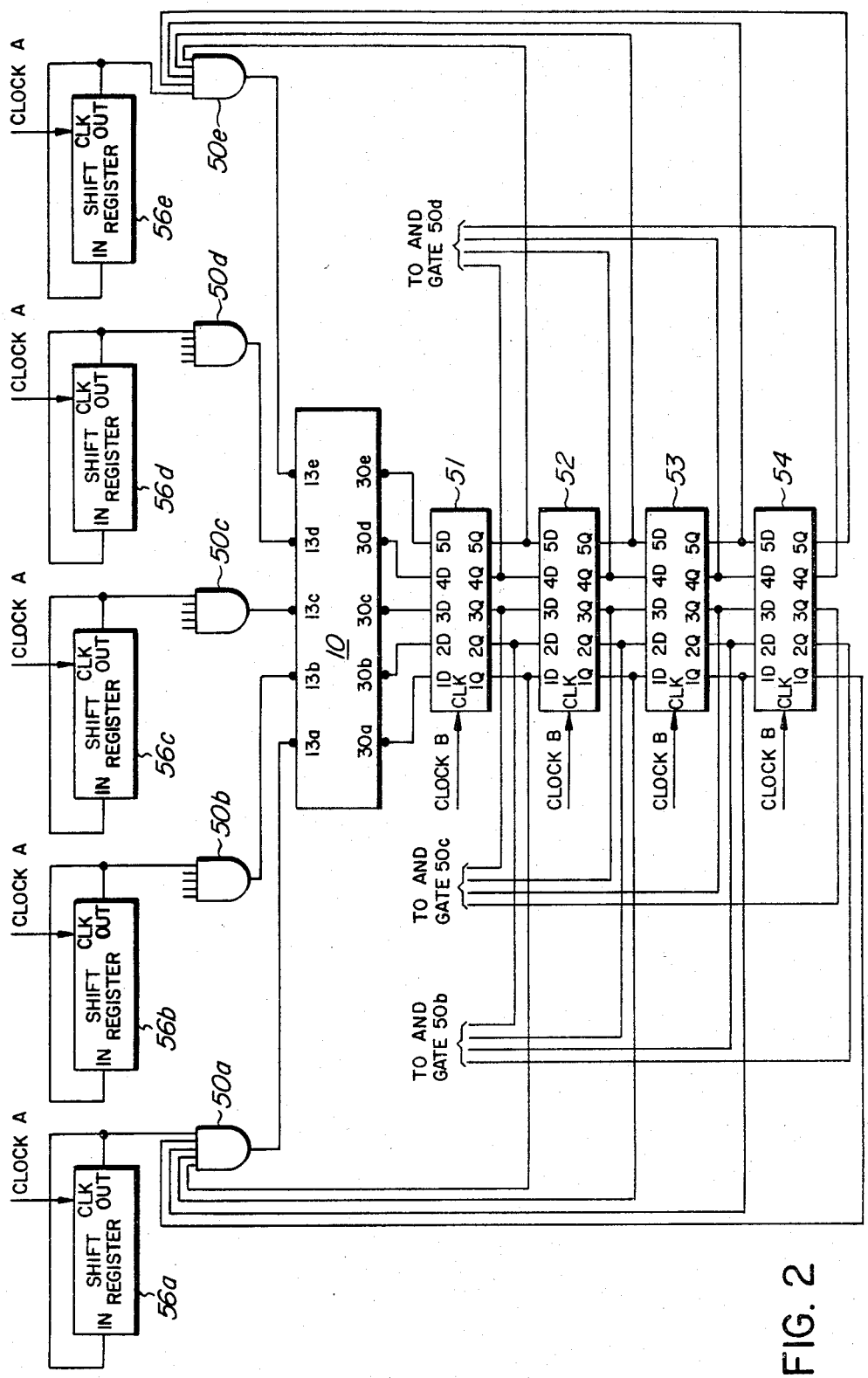
FIG. 2 is a simplified schematic of another embodiment of the present invention.

FIG. 2 depicts another embodiment of the present invention in which the five numbers are ranked in order of significance. In other words, the largest number is determined, the second largest, the third largest, and the fourth largest.

Magnitude comparator 10 is shown in FIG. 2 as a simple block; its construction is identical to that of comparator 10 in FIG. 1. Note that in FIG. 1 comparator 10 includes all the hardware shown in FIG. 1, except for registers 12.

The input terminals 13a, 13b, 13c, 13d, and 13e of comparator 10 are supplied from AND gates 50a, 50b, 50c, 50d, and 50e, respectively, as depicted. The output terminals 30a, 30b, 30c, 30d, and 30e of comparator 10 are applied to input terminals 1D, 2D, 3D, 4D and 5D, respectively of register 51, as depicted. The output terminals 1Q, 2Q, 3Q, 4Q, and 5Q of register 51 are applied to input terminals 1D, 2D, 3D, 4D, and 5D respectively of register 52, as depicted. Registers 53 and 54 are similarly interconnected as depicted in FIG. 2. Registers 51, 52, 53 and 54 are each a Texas Instruments SN74LS174, and are clocked by clock B (e.g. 1 MHz).

The five numbers to be compared are stored in shift registers 56a, 56b, 56c, 56d, and 56e, referred to collectively as registers 56, with one eight-bit number stored in each register 56. Registers 56 are each a Texas Instruments SN74LS164. It will be noted that each output terminal of a register 56 (indicated as "out" is connected back to its own input terminal (indicated as "in") so that the number stored in that register 56 can be recycled through the register.

Before the comparison begins, the contents of each register 51, 52, 53, and 54 are initialized to all logic 1's and the numbers to be compared are loaded into registers 56, one number per register, arranged such that the most significant bit will be the first bit to be outputted by the registers, when clocked, followed by the remaining bits in decreasing order of significance.

When the comparison begins, all the inputs to AND gates 50, from registers 51, 52, 53 and 54 will be logic 1's (since they were so initialized) and consequently the output state of AND gates 50 will be dependent upon the bits received from registers 56. After the first eight bits (in this example, since each number has eight bits) have been received by comparator 10, comparator 10 has determined the largest number and the results of this comparison are stored in register 17 (FIG. 1); this result is transferred to register 51 and register 17 is reinitialized to an all logic 0 state. Recall that this information was stored such that a logic 0 represents the largest number and a logic 1 represents the others. Consequently, the logic 0 stored in register 51, corresponding to the largest number, is applied to the corresponding AND gate 50 and consequently inhibits the passage of the bits from the associated register 56. As a result, only four numbers are applied to comparator 10 the second time around and a comparison is then made to determine the largest number of the remaining four (i.e. the second largest).

To illustrate this, assume that register 56a contains the largest number. After the first cycle of comparator 10 (i.e. the largest of the five numbers is determined) the contents of register 51 are 0, 1, 1, 1, 1 corresponding to terminals 1Q, 2Q, 3Q, 4Q and 5Q respectively. Consequently, the output of AND gate 50a is a constant logic 0. The next (second) cycle of comparator 10, the comparison for largest number is made from the contents of registers 56b, 56c, 56d, and 56e, together with the constant logic 0 output from AND gate 50a.

After the second cycle of comparator 10, the results of the second comparison (i.e. second largest) are transferred to register 51 while the results of the first comparison (i.e. largest) get shifted into register 52.

For the third cycle of comparator 10, the largest and the second largest numbers are thus eliminated from competition and the largest of the three remaining numbers is chosen i.e. the third largest. At the end of the third cycle the results of the third largest are transferred to register 51 while register 52 receives the results of the second comparison and register 53 receives the results of the first comparison.

For the fourth cycle of comparator 10, the three largest numbers are eliminated from comparison and the largest of the two remaining numbers is chosen. At the end of the fourth cycle the results of the fourth largest are transferred to register 51 while register 52 receives the results of the third comparison, register 53 receives the results of the second comparison, and register 54 receives the results of the first comparison. The smallest number is, of course, the remaining number.

While the present invention has been described in terms of five numbers, each number having eight bits it should be recognized that the numbers can have fewer than eight bits, or more, and that the numbers involved can be fewer or more than five. It should also be recognized that instead of ranking all the numbers (e.g. N) presented to the circuitry, it may be desired to determine only so many (e.g. M) of the largest numbers out of the total N. Appropriate modifications would of course be required to the circuitry as depicted herein.

What is claimed is:

1. A circuit for determining which serially received binary number, out of a plurality of binary numbers received bit-serially in parallel, has the largest magnitude, said circuit comprising:
    a storage means having at least a one bit location corresponding to each said binary number; and
    gating means, for each said number, for storing in a respective one of said locations in said storage means, in response to each bit of said number,
    (a) the previous logic state stored in said location if said bit is a binary 1, or
    (b) a first logic state if said bit is a binary 0 and is associated with a binary number that is a remaining candidate for having the largest magnitude and the corresponding bits of the other binary numbers, remaining candidates, are also binary 0's, or
    (c) a second logic state if said bit is a binary 0 and either (i) said bit is not associated with a binary number that is a remaining candidate for having the largest magnitude, or (ii) said bit is associated with a binary number that is a remaining candidate for having the largest magnitude but the corresponding bits of the other binary numbers, remaining candidates, are not all binary 0's.

2. The circuit of claim 1 wherein the first logic state is a logic 0 and wherein the second logic state is a logic 1.

3. The circuit of claim 1 or 2 wherein said bits are received in order of declining significance.

4. The circuit of claim 1 or 2 wherein said storage means is a plurality of flip-flops, one flip-flop for each said number.

5. The circuit of claim 1 or 2 wherein said binary numbers are coded such that a binary 0 is represented by a logic 0 and a binary 1 is represented by a logic 1.

6. A circuit for determining which serially received binary number, out of a plurality of binary numbers, received bit-serially in parallel, has the largest magnitude, said circuit comprising:
    a storage means having a one bit location corresponding to each said binary number; and
    a plurality of gating means, one for each said number, each said gating means responsive to the bits of one said number, bit by bit, in order of declining significance, said gating means inverting each bit received and applying it to said location in said storage means, unless all equal significant bits of binary numbers that remain candidates are binary 0's in which case the bits in said storage means are unchanged, or unless a bit stored in said storage means is a logic 1, in which case that bit remains a logic 1.

7. The circuit of claim 6 wherein said binary numbers are coded such that a binary 0 is represented by a logic 0 and a binary 1 is represented by a logic 1.

8. A method for determining which serially received binary number, out of a plurality of binary numbers, received bit-serially in parallel, has the largest magnitude, said method comprising the steps of:
  (a) for each said number, receiving the bits from said number, one bit at a time, in declining order of significance;
  (b) sequentially inverting each said bit and storing the result in a storage means such that a logic 0 indicates that the corresponding number remains a candidate for being the largest and a logic 1 indicates it has been eliminated, unless
    (i) all the equal significant bits of the numbers that remain candidates are all binary 0, in which case the bits in said storage means are unchanged, or
    (ii) a logic 1 was previously stored in the storage means, in which case it remains a logic 1.

9. The method of claim 8 wherein said binary numbers are coded such that a binary 0 is represented by a logic 0 and a binary 1 is represented by a logic 1.

10. A circuit for ranking, in order of magnitude, a plurality M of N binary numbers received bit-serially in parallel, wherein N and M are positive integers, and $M \leq N$, said circuit comprising:
  N first storage means for storing said N numbers, one number per storage means;
  comparator means, responsive to said storage means, for determining which number, out of the plurality of numbers applied to it, is the largest;
  M second storage means, serially connected, and responsive to the output of said comparator means, for storing the results therefrom;
  N gating means, one for each said number, responsive to said second storage means, for selectively inhibiting the application of said numbers from said first storage means to said comparator means, once said number has been selected as being the largest by said comparator means.

11. The circuit of claim 10 wherein $N=M=5$.

* * * * *